United States Patent [19]

Connors et al.

[11] Patent Number: 5,614,602

[45] Date of Patent: Mar. 25, 1997

[54] PROCESS FOR THE PREPARATION OF AQUEOUS DISPERSION POLYMERS

[75] Inventors: Edward J. Connors, Conshohocken; Michelle L. Cotter, Feasterville; Fu Chen, Newtown, all of Pa.

[73] Assignee: BetzDearborn Inc., Trevose, Pa.

[21] Appl. No.: 677,180

[22] Filed: Jul. 9, 1996

[51] Int. Cl.$^6$ .................................................. C08F 226/02
[52] U.S. Cl. ........................ 526/307.3; 526/278; 526/287
[58] Field of Search ........................................... 526/307.3

[56] References Cited

U.S. PATENT DOCUMENTS

| | | |
|---|---|---|
| 3,147,218 | 9/1964 | Booth et al. |
| 3,316,181 | 4/1967 | Sackis . |
| 4,160,742 | 7/1979 | Raman . |
| 4,224,150 | 9/1980 | Buriks et al. . |
| 4,628,078 | 12/1986 | Glover et al. . |
| 4,650,848 | 3/1987 | Schulz et al. . |
| 4,918,123 | 4/1990 | Yang et al. . |
| 4,929,655 | 5/1990 | Takeda et al. . |
| 5,006,590 | 4/1991 | Takeda et al. . |
| 5,045,587 | 9/1991 | Tanaka ..................... 524/310 |
| 5,068,297 | 11/1991 | Bhattacharyya et al. ............. 526/307.3 |
| 5,294,347 | 3/1994 | Byrne et al. ............................ 210/708 |
| 5,330,650 | 7/1994 | Byrne et al. ............................ 210/708 |
| 5,332,506 | 7/1994 | Marble et al. ......................... 210/705 |
| 5,332,507 | 7/1994 | Braden et al. ........................... 210/708 |
| 5,362,827 | 11/1994 | Bock et al. ............................. 526/307.3 |
| 5,430,092 | 7/1995 | Aydin et al. ............................ 524/458 |
| 5,442,006 | 8/1995 | Aydin et al. ............................ 524/457 |
| 5,516,852 | 5/1996 | Kuo et al. ................................ 525/340 |

FOREIGN PATENT DOCUMENTS

| | | | |
|---|---|---|---|
| 0364175B1 | 4/1990 | European Pat. Off. ...... | C08F 220/34 |
| 0183466B1 | 8/1990 | European Pat. Off. .......... | C08F 2/10 |
| 0630909A1 | 12/1994 | European Pat. Off. .......... | C08F 2/06 |
| 6574782A2 | 6/1995 | European Pat. Off. ...... | C08F 220/56 |

*Primary Examiner*—Joseph L. Schofer
*Assistant Examiner*—N. Sarofim
*Attorney, Agent, or Firm*—Alexander D. Ricci; Matthew W. Smith

[57] ABSTRACT

A process for preparing a water-soluble polymer dispersion is herein provided which is characterized by polymerizing from about 10 to 50 mole percent of a monomer having a formula (II); from about 1 to 50 mole percent of N-alkylacrylamide, N,N-dialkylacrylamide or mixtures thereof; having a formula (III) from about 1 to 70 mole percent acrylamide; and optionally up to about 4 mole percent of a monomer having a formula (I) having a benzyl functionality. The polymerization is carried out in the presence of an aqueous solution of a polyvalent anionic salt which contains (1) a water soluble cationic polymer which is insoluble in the aqueous salt solution and (2) a water soluble cationic polymer which is soluble in the aqueous salt solution.

7 Claims, No Drawings

PROCESS FOR THE PREPARATION OF AQUEOUS DISPERSION POLYMERS

FIELD OF THE INVENTION

The present invention relates to the process of preparing water soluble or water dispersible polymers. More particularly, the present invention relates to the production of water-soluble cationic polymer dispersions useful in water treatment, papermaking, oil field production and refining applications.

BACKGROUND OF THE INVENTION

Cationic polyacrylamides are used extensively in numerous water and process treatment applications. Their high molecular weight and variable charge density make them extremely useful as flocculants for liquid/solid separation, as flotation aids and demulsifiers for oil/water clarification and as retention and drainage aids in paper manufacture. The high solution viscosity associated with these polymers when dissolved in water generally precludes their handling as aqueous solutions due to the low active content (less than 6%) which can be obtained. As a result, cationic polyacrylamides have generally been handled as either dry powders or water-in-oil emulsions. Due to increasing environmental concerns surrounding the oil and surfactants in emulsions as well as the inconvenience and expense associated with feeding dry powders, efforts to develop alternative delivery systems for these polymers have intensified in recent years.

The goal of these efforts has been to develop delivery systems, in liquid form, having high active content, which do not contain hydrocarbon oil or volatile organic components (VOCs) and which perform comparably to analogous emulsion and powder polymer products.

The prior art efforts generally have focused on polymer dispersions prepared from water soluble monomer mixtures containing at least 5 mole percent of a cationic monomer with an aromatic functional group which is preferably a quaternary ammonium salt obtained by the reaction of benzyl chloride and dimethylaminoethyl acrylate (AEBAC), and to those prepared with polylols soluble in an aqueous salt solution.

However, these polymeric dispersions are difficult to produce when using monomer concentrations of about 15 weight percent or higher due to in-production viscosity peaks which are generally too high for commercial production equipment. It is possible to lower the monomer concentration, however this results in lower polymer concentration in the product polymeric dispersion. It is also possible to increase the multivalent anionic salt concentration to reduce viscosity after polymerization of the monomer. However, the salt concentration cannot be increased during polymerization because the rapid precipitation rate can result in the formation of a gel instead of a dispersion. Monomers having benzyl functional groups are also expensive to prepare and their inclusion in polymer products limits the variety of polymers which can be produced by prior art polymerization techniques.

Therefore, a need exists for a method to produce water-soluble cationic polymer dispersions which are not limited to containing at least 5 mole percent of a benzyl functionality.

Accordingly, it is an object of this invention to provide a method of producing water-soluble cationic polymer dispersions having less than 5 mole percent benzyl functionality which are useful in water treatment applications.

PRIOR ART

U.S. Pat. No. 4,929,655 to Takeda et al. discloses a process for the production of a water soluble dispersion which includes polymerization of 5 to 100 mole % of a water soluble cationic monomer represented by the following formula (I) which has a benzyl functionality, 0 to 50 mole % of another cationic monomer represented by the following formula (11) and 0 to 95 mole % (meth)acrylamide in the presence of 1 to 10% by weight of an organic high molecular weight multivalent cation dispersant comprising a water soluble polymer containing at least one monomer of formula (II), based on the total weight of the monomers, in an aqueous multivalent anionic salt solution which has a concentration of 15% by weight or more. Formula I has the formula:

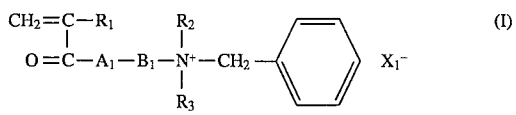

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion. Formula II has the formula:

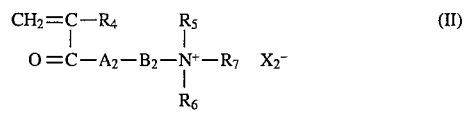

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion. A polyol, such as glycerin or ethylene glycol can also be used to enhance polymer deposition.

U.S. Pat. No. 5,006,590, Takeda et al. and EP 364175 are similar to Takeda '655, except that polymerization is carried out in the presence of both: (1) a water soluble cationic seed polymer which is insoluble in an aqueous solution of a polyvalent anionic salt; and (2) a water soluble cationic dispersant polymer which is soluble in an aqueous solution of a polyvalent anionic salt. The water soluble cationic seed polymer that is insoluble in the aqueous solution of polyvalent anionic salt contains at least 5 mole % of cationic monomer units which have a benzyl functionality and are represented by the aforementioned general formula (I) above and the water soluble cationic dispersant polymer that is soluble in the aqueous solution of a polyvalent anionic salt contains at least 20 mole % of cationic monomer units represented by the general formula (11) above.

EP 0183466B1 to Takeda et al. is also similar to Takeda '655, except that a polyol soluble in an aqueous salt solution can be used as a substitute for or in addition to a polymer electrolyte dispersant. The disclosed method allows the production of polymer dispersions free of benzyl functional groups in the active polymer.

EP 0630909A1 discloses a process for preparing a water-soluble polymer dispersion in which a portion of the monomer is fed to the reaction mixture after the polymerization reaction has been initiated to reduce the bulk viscosity of the reaction mixture during polymerization without a high loading of polyvalent salt.

EP 6574782A2 discloses that optimizing the multivalent anionic salt concentration controls the particle size and reduces the viscosity of water soluble polymer dispersions.

SUMMARY OF THE INVENTION

The present invention is directed to a process for preparing a water soluble polymer dispersion characterized by polymerizing from about 10 to about 50 mole percent of a monomer having a formula (II)

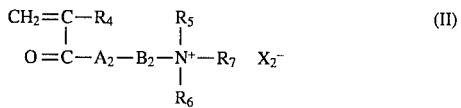

where $R_4$ is H or $CH_3$; $R_5$ and $R_6$ are alkyl groups having 1 to 3 carbon atoms; $R_7$ is H or an alkyl group having 1 to 3 carbon atoms; $A_2$ is an oxygen atom or NH; $B_2$ is an alkylene group having 2 to 4 carbon atoms or a hydroxypropylene group, and $X_2^-$ is an anionic counterion; from about to 50 mole percent of N-alkylacrylamide, N,N-dialkylacrylamide or mixtures thereof; having the formula (III)

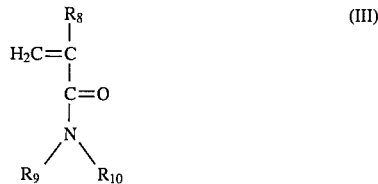

where $R_8$ is H or $CH_3$; and $R_9$ and $R_{10}$ are H or an alkyl group having 1 to 5 carbon atoms with the proviso that $R_9$ and $R_{10}$ cannot both be H; from about 1 to 70 mole percent (meth)acrylamide; and optionally up to about 4 mole percent of a monomer of formula (I) having a benzyl functionality

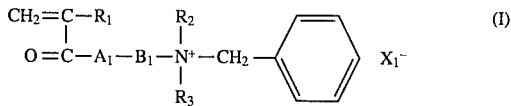

where $R_1$ is H or $CH_3$; $R_2$ and $R_3$ are each an alkyl group having 1 to 3 carbon atoms; $A_1$ is an oxygen atom or NH; $B_1$ is an alkylene group having 2 to 4 carbon atoms or a hydroxypropylene group; and $X_1^-$ is an anionic counterion; wherein said polymerization is carried out in the presence of an aqueous solution of a polyvalent anionic salt. The salt solution contains (1) a water soluble cationic polymer which is insoluble in said aqueous salt solution; and (2) a water soluble cationic polymer soluble in said aqueous salt solution.

The present invention is also directed to water soluble brine dispersible copolymers produced by the above process and to methods of using said copolymeric dispersions.

DETAILED DESCRIPTION OF THE INVENTION

In an effort to develop a polymeric dispersion system, we have discovered that by utilizing a portion of the acrylamide monomer in a dispersion system with one or more N-alkyl or N,N-dialkyl acrylamide monomers, stable dispersions can be prepared with less than 5 mole percent benzyl quat monomer or without any benzyl quat monomer. In fact, stable dispersions can be produced using a methyl chloride quaternary ammonium salt as the only cationic monomer. Besides the potential cost savings in reducing the amount of benzyl quat monomer required in the formulation, the polymers of this invention also demonstrate significant efficacy in sludge dewatering and paper retention relative to the benzyl chloride quaternary based dispersions. The preferred non-benzyl group containing comonomers of interest in this invention include N-alkyl acrylamide monomers such as N-isopropyl acrylamide (IPAM) and N-tert-butyl acrylamide (t-BAM) as well as N,N-dialkyl acrylamides such as N,N-dimethylacrylamide (DMAM). These monomers have been shown to be effective at lowering the solubility of the dispersion polymer such that precipitation from the brine is readily achieved without viscosities greater than about 3000 cp. Copolymers of acrylamide with an N-alkyl acrylamide or N,N-dialkyl acrylamide monomer along with a methyl chloride quaternary cationic monomer and with or without up to 4 mole percent of a benzyl chloride quaternary cationic monomer have been prepared in the form of stable aqueous dispersions with up to 20% active polymer content. The dispersions are storage stable for several months and dissolve readily in water to produce solutions which are useful for applications such as sludge dewatering and paper retention.

The dispersions are characterized by polymerizing a) from about 10 to about 50 mole percent of a monomer of formula (II):

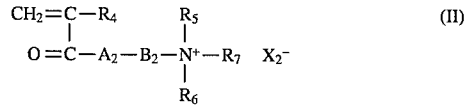

where $R_4$ is H or $CH_3$; $R_5$ and $R_6$ are each an alkyl group having 1 to 3 carbon atoms; $R_7$ is H or an alkyl group having 1 to 3 carbon atoms; and $X_2^-$ is an anionic counterion; b) from about 1 to 50 mole percent of N-alkylacrylamide, N,N-dialkylacrylamide or mixtures thereof; having the formula

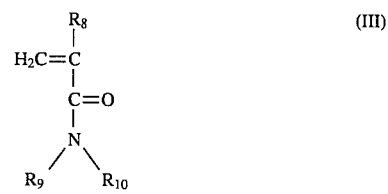

where $R_8$ is H or $CH_3$; and $R_9$ and $R_{10}$ are H or an alkyl group having 1 to 5 carbon atoms, with the proviso that $R_9$ and $R_{10}$ cannot both be H; c) from about 1 to 70 mole percent (meh)acrylamide; and d) optionally up to about 4 mole percent of a monomer of formula (I)

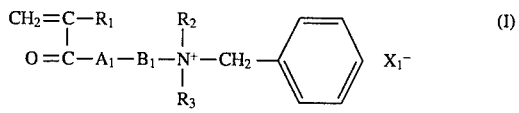

where $R_1$ is H or $CH_3$; $R_2$ and $R_3$ are alkyl groups having 1 to 3 carbon atoms; $A_1$ is an oxygen atom or NH; $B_1$ is an alkylene group having 2 to 4 carbon atoms or a hydroxypropylene group; and $X_1^-$ is an anionic counterion in an aqueous solution of a polyvalent anionic salt with the proviso that the sum of a), b), c), and d) equals 100 mole percent. The aqueous solution of polyvalent anionic salt contains a water soluble cationic seed polymer which is insoluble in said aqueous salt solution, a water soluble cationic dispersant polymer soluble in said aqueous salt solution and a polyvalent salt.

Representative monomers represented by the formula (II) including dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate, and their methylated and ethylated quaternary salts.

Representative monomers represented by the formula (I) include quaternary monomers obtained by treating dimethylaminoethyl (meth)acrylate, diethylaminoethyl (meth)acrylate, dimethylaminopropyl (meth)acrylamide, diethylaminopropyl (meth)acrylamide and dimethylaminohydroxylpropyl (meth)acrylate with benzyl chloride.

The polyvalent salt used to precipitate the polymer from the aqueous salt solution is preferably a sulfate or phosphonate such as ammonium, sodium, magnesium or aluminum sulfate or ammonium sodium or potassium hydrogen phosphate. The concentration of salt in the aqueous salt solution is preferably 15% by weight or more. Suitable seed polymers are water-soluble cationic polymers which are insoluble in the salt solution. The preferred polymers are salt solution-insoluble copolymers containing monomers of formula (II) with monomers of formula (III) and salt solution-insoluble terpolymers containing monomers of formula (I), monomers of formula (II) and monomers of formula (III).

Suitable dispersant polymers are water soluble cationic polymers which are soluble in the salt solution. The preferred polymers are salt solution-soluble homopolymers of formula (II) and salt solution-soluble copolymers containing monomers of formula (II) and acrylamide.

This invention is more particularly described by the following examples, which are to be regarded solely as illustrative, and not as restricting the scope of the invention.

EXAMPLES

In a typical dispersion preparation, the monomers, salt, dilution water and stabilizers are added to a 1000 cc resin kettle and mixed until completely dissolved. A chelating agent is then added to deactivate the polymerization inhibitor present in the acrylamide. The kettle is equipped with an overhead stirrer, reflux condenser, thermocouple, addition port with septum and a nitrogen sparge tube. The mixture is generally mixed at 500–600 rpm and slowly heated to 50° C., a 1% aqueous solution of 2,2'-azobis(2-amidinopropane)dihydrochloride (Wako V-50) or other suitable initiator is prepared and a portion of which is shot into the reactor to initiate the polymerization. At the start of the reaction, all of the components of the system are soluble (or dispersible) in the brine continuous phase so that the mixture is initially transparent or slightly hazy. The onset of polymerization is evidenced by a change in the appearance of the reaction mixture from clear to hazy. This change is consistent with the initiation of polymer chains in the brine continuous phase which are initially soluble at low molecular weight, but which precipitate from the brine as their molecular weight is increased. The stabilizers serve to prevent agglomeration of the precipitated polymer particles resulting in a fine particle size for the final dispersion. As the polymerization is continued, the mixture becomes increasingly hazy until finally a milky white dispersion is obtained. The bulk viscosity of the mixture is generally seen to increase during the polymerization process, but typically remains below 5000 cps. Additional salt may be added during or after the polymerization process to reduce the bulk viscosity so that the final dispersion will have a bulk viscosity less than about 3000 cps, more preferably less than about 2600 cps. After heating the dispersion for several hours, a second shot of initiator may be added to reduce the residual monomer content. The mixture is then cooled to room temperature to yield a fine, white dispersion. The final dispersion readily dissolves in water with minimal agitation to produce a viscous polymer solution having viscosities of preferably about 1000 cp or less.

Example 1—40/20/40 AETAC/AM/DMAM
Aqueous Dispersion

To a 1000 cc reaction kettle was added 18.38 grams of acrylamide AMD (53% aqueous solution), 66.36 grams of dimethylaminoethyl acrylate methyl chloride quaternary (80% aqueous solution), 27.45 grams of N,N-dimethyl acrylamide (99%), 90.00 grams of ammonium sulfate, 7.5 grams of the homopolymer of dimethylaminoethyl acrylate methyl chloride quaternary (AETAC, CAS 44992-01-0); 7.5 grams of a terpolymer of acrylamide with (AETAC) and with a quaternary ammonium salt obtained by the reaction of benzyl chloride and dimethylaminoethyl acrylate (AEBAC, CAS 7737-18-5) in a 2/1/1 molar ratio; 0.50 grams of diethylenetriamine pentaacetic acid; pentasodium salt (Versenex 80, 40% aqueous) and 231.61 grams of deionized water. The mixture was stirred until a homogeneous solution was obtained. The kettle was sealed and equipped with an overhead stirrer, thermocouple, reflux condenser, nitrogen sparge tube, addition port with septum and a heating mantle. The mixture was then heated to 50° C. under constant nitrogen sparge while stirring at 500 rpm. After reaching 50° C, 0.50 grams of a 1% aqueous solution of 2,2'-azobis(2-amidinopropane)dihydrochloride (Wako V-50) was shot into the reactor and the temperature was held for four hours. A second shot of 1.00 gram of 1% aqueous solution of 2,2'-azobis(2-amidinopropane)dihydrochloride was then added and heating was continued for another two hours to yield a smooth, milky white dispersion. After cooling to room temperature, the bulk viscosity was found to be 732 cps. Diluting the dispersion to 0.5% active polymer in deionized water produced a polymer solution with a Brookfield viscosity of 100 cps.

Using the similar procedure and equipment described for Example 1, the following dispersions have also been prepared:

Example 2—3614140120
AETAC/AEDBAC/AM/DMAM Aqueous
Dispersion

| | |
|---|---:|
| Dimethylaminoethylacrylate methyl chloride quaternary (80%) | 45.71 grams |
| Dimethylaminoethylacrylate benzyl chloride quaternary (80%) | 7.07 grams |
| Acrylamide (53%) | 28.12 grams |
| N,N-dimethyl acrylamide (99%) | 10.49 grams |
| Poly(AETAC) | 7.50 grams |
| Terpoly(AETAC/AEDBAC/AM) | 7.50 grams |
| Deionized Water | 252.60 grams |

| | |
|---|---|
| Ammonium Sulfate | 90.00 grams |
| Versenex 80 | 0.50 grams |
| Wako V-50 (1.0%) | 0.50 grams |
| Ammonium Sulfate (added in-process) | 35.00 grams |
| | 485.00 grams |
| Final Actives Content | 13.9% |

The final product was in the form of a smooth, milky white dispersion with a bulk viscosity of 250 cps. A 0.5% solution of the active polymer in DI water had a Brookfield viscosity of 59 cps.

Example 3—36/4140120 AETAC/AEDBAC/AM/IPAM Aqueous Dispersion

| | |
|---|---|
| Dimethylaminoethylacrylate methyl chloride quaternary (80%) | 44.71 grams |
| Dimethylaminoethylacrylate benzyl chloride quaternary (80%) | 6.91 grams |
| Acrylamide (53%) | 27.52 grams |
| N-isopropyl acrylamide (99%) | 11.73 grams |
| Poly(AETAC) | 7.50 grams |
| Terpoly(AETAC/AEDBAC/AM) | 7.50 grams |
| DI Water | 253.13 grams |
| Ammonium Sulfate | 90.00 grams |
| Versenex 80 | 0.50 grams |
| Wako V-50 (1.0%) | 0.50 grams |
| Ammonium Sulfate (added in-process) | 50.00 grams |
| | 500.00 grams |
| Final Actives Content | 13.5% |

The final product was in the form of a smooth, milky white dispersion with a bulk viscosity of 1180 cps. A 0.5% solution of the active polymer in DI water had a Brookfield viscosity of 45 cps.

Example 4—36/4/57/3 AETAC/AEDBAC/AM/t-BAM Aqueous Dispersion

| | |
|---|---|
| Dimethylaminoethylacrylate methyl chloride quaternary (80%) | 47.11 grams |
| Dimethylaminoethylacrylate benzyl chloride quaternary (80%) | 7.28 grams |
| Acrylamide (53%) | 41.33 grams |
| N-tert-butyl acrylamide (99%) | 2.08 grams |
| Poly(AETAC) | 7.50 grams |
| Terpoly(AETAC/AEDBAC/AM) | 7.50 grams |
| DI Water | 246.20 grams |
| Ammonium Sulfate | 90.00 grams |
| Versenex 80 | 0.50 grams |
| Wako V-50 (1.0%) | 0.50 grams |
| Ammonium Sulfate (added in-process) | 80.00 grams |
| | 530.00 grams |
| Final Actives Content | 12.7% |

The final product was in the form of a smooth, milky white dispersion with a bulk viscosity of 1180 cps. A 0.5% solution of the active polymer in DI water had a Brookfield viscosity of 45 cps.

Example 5—20/40/40 AETAC/AM/DMAM Aqueous Dispersion

| | |
|---|---|
| Dimethylaminoethylacrylate methyl chloride quaternary (80%) | 30.60 grams |
| Acrylamide (53%) | 33.92 grams |
| N,N-dimethyl acrylamide (99%) | 25.29 grams |
| Poly(AETAC) | 7.50 grams |
| Terpoly(AETAC/AEDBAC/AM) | 7.50 grams |

| | |
|---|---|
| DI Water | 254.19 grams |
| Ammonium Sulfate | 90.00 grams |
| Versenex 80 | 0.50 grams |
| Wako V-50 (1.0%) | 0.50 grams |
| Ammonium Sulfate (added in-process) | 10.00 grams |
| | 460.00 grams |
| Final Actives Content | 14.7% |

The final product was in the form of a smooth, milky white dispersion with a bulk viscosity of 380 cps. A 0.5% solution of the active polymer in DI water had a Brookfield viscosity of 50 cps.

Example 6—614160120
AETAC/AEDBAC/AM/DMAM Aqueous Dispersion

| | |
|---|---|
| Dimethylaminoethylacrylate methyl chloride quaternary (80%) | 33.46 grams |
| Dimethylaminoethylacrylate benzyl chloride quaternary (80%) | 11.63 grams |
| Acrylamide (53%) | 69.48 grams |
| N,N-dimethyl acrylamide (99%) | 17.27 grams |
| Poly(AETAC) | 7.50 grams |
| Terpoly(AETAC/AEDBAC/AM) | 7.50 grams |
| DI Water | 212.16 grams |
| Ammonium Sulfate | 90.00 grams |
| Versenex 80 | 0.50 grams |
| Wako V-50 (1.0%) | 0.50 grams |
| Ammonium Sulfate (added in-process) | 10.00 grams |
| | 460.00 grams |
| Final Actives Content | 19.6% |

The final product was in the form of a smooth, milky white dispersion with a bulk viscosity of 1700 cps. A 0.5% solution of the active polymer in DI water had a Brookfield viscosity of 74 cps.

Example 7—20/40/38/2
AETAC/AM/DMAM/t-BAM Aqueous Dispersion

| | |
|---|---|
| Dimethylaminoethylacrylate methyl chloride quaternary (80%) | 40.57 grams |
| Acrylamide (53%) | 44.97 grams |
| N,N-dimethyl acrylamide (99%) | 31.85 grams |
| N-tert-butyl acrylamide (99%) | 2.16 grams |
| Poly(AETAC) | 7.50 grams |
| Terpoly(AETAC/AEDBAC/AM) | 7.50 grams |
| Di Water | 224.45 grams |
| Ammonium Sulfate | 90.00 grams |
| Versenex 80 | 0.50 grams |
| Wako V-50 (1.0%) | 0.50 grams |
| | 450.00 grams |
| Final Actives Content | 20.0% |

The final product was in the form of a smooth, milky white dispersion with a bulk viscosity of 1300 cps. A 0.5% solution of the active polymer in DI water had a Brookfield viscosity of 95 cps.

Example 8—2014013812
AETAC/AM/DMAM/t-BAM Aqueous Dispersion

| | |
|---|---|
| Dimethylaminoethylacrylate methyl chloride quaternary (80%) | 40.57 grams |
| Acrylamide (53%) | 44.97 grams |
| N,N-dimethyl acrylamide (99%) | 31.85 grams |
| N-tert-butyl acrylamide (99%) | 2.16 grams |

| | |
|---|---:|
| Copoly(AETAC/AM) | 7.50 grams |
| Copoly(AETAC/DMAM) | 7.50 grams |
| DI Water | 224.45 grams |
| Ammonium Sulfate | 90.00 grams |
| Versenex 80 | 0.50 grams |
| Wako V-50 (1.0%) | 0.50 grams |
| | 450.00 grams |
| Final Actives Content | 20.0% |

The final product was in the form of a smooth, milky white dispersion with a bulk viscosity of 1090 cps. A 0.5% solution of the active polymer in DI water had a Brookfield viscosity of 85 cps.

Comparative Example 1—40/60 AETAC/AM Aqueous Dispersion

This example was prepared using the similar procedure and equipment described for Example 1, except a comonomer of formula (III) was not added:

| | |
|---|---:|
| Dimethylaminoethylacrylate methyl chloride quaternary (80%) | 54.42 grams |
| Acrylamide (53%) | 45.22 grams |
| Poly(AETAC) | 7.50 grams |
| Terpoly(AETAC/AEDBAC/AM) | 7.50 grams |
| DI Water | 224.36 grams |
| Ammonium Sulfate | 90.00 grams |
| Versenex 80 | 0.50 grams |
| Wako V-50 (1.0%) | 0.50 grams |
| Ammonium Sulfate (added in-process) | 100.00 grams |
| | 550.00 grams |

Even after adding 100 grams of additional ammonium sulfate during the polymerization process, the reaction mixture became a solid mass which could no longer be agitated after 30 minutes of heating at 50° C. After cooling to room temperature, the bulk viscosity of the final product was >100,000 cps.

Comparative Example 2—20/80 AETAC/AM Aqueous Dispersion

This example was prepared using the similar procedure and equipment described for Example 5, except that a comohomer of formula (III) was not added:

| | |
|---|---:|
| Dimethylaminoethylacrylate methyl chloride quaternary (80%) | 45.71 grams |
| Acrylamide (53%) | 28.12 grams |
| Poly(AETAC) | 7.50 grams |
| Terpoly(AETAC/AEDBAC/AM) | 7.50 grams |
| DI Water | 270.17 grams |
| Ammonium Sulfate | 90.00 grams |
| Versenex 80 | 0.50 grams |
| Wako V-50 (1.0%) | 0.50 grams |
| Ammonium Sulfate (added in-process) | 100.00 grams |
| | 550.00 grams |

Even after adding 100 grams of additional ammonium sulfate during the polymerization process, the reaction mixture became; a solid mass which could no longer be agitated after one hour of heating at 50° C. After cooling to room temperature, the bulk viscosity of the final product was >50,000 cps.

As can be seen from the preceding examples, incorporation of a nonionic hydrophobic comonomer into a cationic acrylamide copolymer containing less than five mole percent of a benzyl chloride quaternary cationic monomer allows for the production of high molecular weight polymers in the form of a stable aqueous dispersion with low bulk viscosity. In some cases, the benzyl chloride quaternary monomer can be completely eliminated. However, as illustrated in Comparative Examples 1 and 2, when the comonomer of formula (III) is left out of the formulation, the reaction mixture solidifies due to a failure of the polymer to precipitate from the brine. Active polymer contents up to 25% have been achieved while maintaining a stable, pourable dispersion system. All of the dispersion polymers makedown readily in water to yield homogeneous polymer solutions. Based on the 0.5% solution viscosities of the polymers, the molecular weights are effective for flocculation of industrial wastewaters.

Polymer efficacy was evaluated by two methods. First, a clay settling test was used which measures the increase in settling rate of a fine clay slurry induced by the addition of the polymer. The clay used to form the slurry (Hydrite R available from Georgia Kaolin Co.) possesses a net anionic surface charge which causes the clay particulates; to repel each other and resist settling. Addition of a cationic polymer to the slurry neutralizes the surface charge so that interparticle repulsion is reduced. The polymer also serves to bridge the neutralized particles to form larger agglomerates or "floc" which speeds the settling out of the clay. To investigate relative polymer performance, the settling rate of the clay is measured as a function of polymer dosage and compared to the settling rate observed in the absence of any polymer (blank rate). Secondly, several of the dispersion polymers were evaluated using a Modified Buchner Funnel Test using substrate taken from two industrial waste treatment plants.

Polymer samples from each of the Examples 1–7 above were evaluated on Hydrite R clay as follows:

| Settling Rate (mm/sec) at Active Polymer Dosage (ppm) | | | | | | |
|---|---|---|---|---|---|---|
| Example No. | 8 | 12 | 16 | 20 | 24 | 32 |
| 1 | — | 3.8 | 6.0 | 7.7 | 9.6 | — |
| 2 | 2.8 | 4.0 | 5.3 | 6.2 | | |
| 3 | 2.2 | 2.5 | 3.2 | — | — | — |
| 4 | 3.7 | 4.7 | 5.1 | 7.2 | — | — |
| 5 | 3.1 | — | 4.3 | — | 6.2 | — |
| 6 | 3.7 | — | 7.5 | — | 11.8 | 13.5 |
| 7 | — | 5.0 | 6.2 | 7.0 | 8.8 | 10.0 |
| Blank | 0.05 mm/sec | | | | | |

The results of the clay settling test indicate an increase; in the settling rate of the clay in the presence of very low dosages of the dispersion polymers. In the absence of polymer, the clay settles at ian extremely slow rate. The increase in settling rate is comparable to that observed using conventional powder and emulsion based cationic flocculants.

Modified Buchner Funnel tests were performed on polymer samples taken from Examples 6, 8 and 9 using a primary sludge taken from a Northeastern U.S. paper mill. The substrate (200 cc) was dosed with the required amount of each polymer and mixed for 15 seconds to allow floc formation. The conditioned sludge was then discharged into a Buchner funnel containing a mesh screen which allows for drainage of the free water through the funnel and into a graduated cylinder. As the water drains, a sludge cake is formed on top of the screen. The volume of flitrate collected after 20 seconds of free drainage was then recorded as a function of polymer dosage. This test is designed to simulate; the free drainage section of a standard industrial belt filter press. Polymer dewatering performance was evaluated relative to the unconditioned sludge (blank) as well as a commercially available cationic emulsion polymer with equivalent charge density. The results were as follows:

| Filtrate Collected (cc) After 20 Seconds at Active Polymer Dosage (ppm) | | | | | | |
|---|---|---|---|---|---|---|
| Example No. | 20 | 40 | 60 | 80 | 100 | 120 |
| 6 | 68 | 93 | 96 | 74 | — | — |
| Emulsion Polymer A | 68 | 105 | 110 | 105 | — | — |
| Blank | 23 cc collected after 20 seconds | | | | | |

The results of the Buchner funnel test indicate excellent dewatering efficacy for the dispersion polymer. The volume of flitrate collected at the optimum polymer dosage was approximately five times greater for the dispersion polymer compared to the unconditioned sludge. The dewatering performance of the dispersion polymers is equivalent to the commercially available emulsion based polymer on an active basis.

Modified Buchner Funnel tests were also performed an polymer samples taken from Example 6 using a biological sludge taken from a Southeastern U.S. chemical plant. The substrate (200 cc) was dosed with the required amount of each polymer and mixed for 15 seconds to allow floc formation. The conditioned sludge was then discharged into a. Buchner funnel containing a mesh screen which allows for drainage of the free water through the funnel and into a graduated cylinder. As the water drains, a sludge cake is formed on the screen. The volume of flitrate collected after 20 seconds of free drainage was recorded as a function of polymer dosage. Dewatering performance was evaluated relative to the unconditioned sludge (blank) as well as two commercially available cationic emulsion polymers with equivalent charge density. The results were as follows:

| Filtrate Collected (cc) After 20 Seconds at Active Polymer Dosage (ppm) | | | | | | |
|---|---|---|---|---|---|---|
| Example No. | 125 | 150 | 175 | 200 | 250 | 300 |
| 6 | 42 | 76 | 96 | 120 | 122 | 125 |
| Emulsion Polymer B | — | — | 57 | 90 | 118 | 124 |
| Emulsion Polymer C | — | 62 | 83 | 108 | 120 | 98 |
| Blank | 15 cc collected after 20 seconds | | | | | |

Wherein:

Emulsion Polymer B is Polymer 2676 and Emulsion Polymer C is Polymer 2660, both available commercially from BetzDearborn Inc.

The results of the Buchner funnel test indicate excellent dewatering efficacy for the dispersion polymer. The volume of flitrate collected at the optimum polymer dosage was approximately eight times greater when using the invention dispersion polymer compared to the unconditioned sludge. The clarity of the flitrate was also much better in the presence of the dispersion polymer indicating high solids capture. The performance of the dispersion polymer is equivalent to the analogous emulsion polymers on an active basis.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A process for the production of a water soluble copolymer dispersion which is characterized by polymerizing:

a) from about 10 to about 50 mole percent of a monomer having the formula (II):

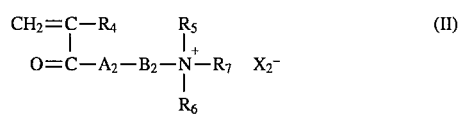

wherein $R_4$ is H or $CH_3$; $R_5$ and $R_6$ are alkyl groups having 1 to 3 carbon atoms; $R_7$ is H or an alkyl group having 1 to 3 carbon atoms; $A_2$ is an oxygen atom or NH; $B_2$ is an alkylene group having 2 to 4 carbon atoms or a hydroxypropylene group, and $X_2^-$ is an anionic counterion;

b) from about 1 to about 50 mole percent of a N-alkylacrylamide, a N,N-dialkylacrylamide or mixtures thereof having the formula (III):

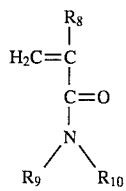 (III)

where $R_8$ is H or $CH_3$; and $R_9$ and $R_{10}$ are H or an alkyl group having 1 to 5 carbon atoms, with the proviso that $R_9$ and $R_{10}$ are not both H;

c) from about 1 to 70 mole percent (meth)acrylamide; and d) optionally up to about 4 mole percent of a monomer having the formula (I)

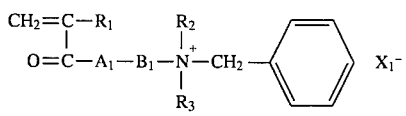 (I)

where $R_1$ is H or $CH_3$; $R_2$ and $R_3$ are alkyl groups having from 1 to 3 carbon atoms; $A_1$ is an oxygen atom or NH; $B_1$ is an alkylene group having 2 to 4 carbon atoms or a hydroxypropylene group; and $X_1^-$ is an anionic counterion;

with the proviso that the sum of a, b, c and d equals 100%; and wherein said polymerization is carried out in the presence of an aqueous salt solution containing a water-soluble cationic polymer insoluble in said aqueous salt solution; a water-soluble cationic polymer soluble in said aqueous salt solution; and a polyvalent anionic salt.

2. The process of claim 1 wherein said N-alkylacrylamide is N-isopropyl acrylamide or N-tert-butylacrylamide and said N,N-dialkylacrylamide is N,N-dimethylacrylamide.

3. The process of claim 1 wherein said polyvalent anionic salt is a sulfate or phosphonate salt.

4. The process of claim 1 wherein said monomer represented by the formula (II) is selected from the group consisting of diethylaminoethyl (meth)acrylate, diethylaminoethyl (meth)acrylate, dimethylaminopropyl (meth)acrylamide, diethylaminopropyl (meth)acrylamide, dimethylhydroxypropyl (meth)acrylate and methylated and ethylated quaternary salts thereof.

5. The process of claim 1 wherein said monomer represented by formula (I) is selected from the group consisting of dimethylaminoethyl (meth)acrylate, diethylaminoethyl (meth)acrylate, dimethylaminopropyl (meth)acrylamide, diethylaminopropyl (meth)acrylamide and dimethylaminohydroxypropyl (meth)acrylamide with benzyl chloride.

6. The process of claim 1 wherein said water-soluble cationic polymer insoluble in said aqueous salt solution is a salt solution-insoluble copolymer of a monomer of formula (II) and (meth)acrylamide, or a salt solution-insoluble terpolymer of (meth)acrylamide with a monomer of formula (I) and a monomer of formula (II).

7. The process of claim 1 wherein said water-soluble cationic polymer soluble in said aqueous salt solution is a salt solution-soluble homopolymer of formula (II) or a salt solution-soluble copolymer of formula (II) and (meth)acrylamide.

* * * * *

UNITED STATES PATENT AND TRADEMARK OFFICE
CERTIFICATE OF CORRECTION

PATENT NO.  : 5,614,602
DATED       : March 25, 1997
INVENTOR(S) : Connors, et al.

It is certified that error appears in the above-identified patent and that said Letters Patent is hereby corrected as shown below:

Col. 6, lines 56 and 57 should read:
        Example 2-36/4/40/20
        AETAC/AEDBAC/AM/DMAM Aqueous Col. 7, lines 15 and 16 should read:
        Example 3-36/4/40/20
        AETAC/AEDBAC/AM/IPAM Aqueous Dispersion Col. 9, lines 16 and 17 should read:
        Example 6-16/4/60/20
        AETAC/AEDBAC/AM/DMAM Aqueous Col. 10, lines 11 and 12 should read:
        Example 8-20/40/38/2
        AETAC/AM/DMAM/t-BAM Aqueous Dispersion Signed and Sealed this Twelfth Day of May, 1998

*Attest:*

BRUCE LEHMAN

*Attesting Officer*      *Commissioner of Patents and Trademarks*